(12) United States Patent  (10) Patent No.: US 8,154,156 B2
Hsu  (45) Date of Patent: Apr. 10, 2012

(54) COIL ASSEMBLY FOR LINEAR MOTOR

(75) Inventor: Ming-che Hsu, Sinshih Township, Tainan County (TW)

(73) Assignee: Chieftek Precision Co., Ltd., Tainan County (TW)

( * ) Notice: Subject to any disclaimer, the term of this patent is extended or adjusted under 35 U.S.C. 154(b) by 262 days.

(21) Appl. No.: 12/724,930

(22) Filed: Mar. 16, 2010

(65) Prior Publication Data

US 2011/0227423 A1 Sep. 22, 2011

(51) Int. Cl.
*H02K 41/02* (2006.01)

(52) U.S. Cl. .................................... 310/12.22

(58) Field of Classification Search .......... 310/21, 310/22, 23, 43
See application file for complete search history.

(56) References Cited

U.S. PATENT DOCUMENTS

| | | | | |
|---|---|---|---|---|
| 5,783,877 | A | * | 7/1998 | Chitayat .................... 310/12.33 |
| 6,140,734 | A | * | 10/2000 | Hazelton et al. ........... 310/12.22 |
| 6,661,128 | B2 | * | 12/2003 | Mori et al. ................. 310/12.22 |

FOREIGN PATENT DOCUMENTS

TW  I288521  10/2007

* cited by examiner

*Primary Examiner* — Nguyen N Hanh (74) *Attorney, Agent, or Firm* — Muncy, Geissler, Olds & Lowe, PLLC (57) ABSTRACT

A coil assembly for a linear motor includes a coil unit which has multiple adjacently arranged coils, a base, and a resin encapsulated layer. The coils have two corresponding vertical action sides, a first non-action side, and a second non-action side. The coils further form multiple interlaced first bending sections on the first non-action side. Plural conducting wires disposed on the second non-action side could connect to an external cable on an end section of the coil unit. The base has a receiving slot thereon. The cross-section of the receiving slot corresponds in shape to that of the first bending sections for insertion of the coils. The resin encapsulated layer covering the coils and sealing the receiving slot of the base increases the contacting area between the coils and the inner wall of the receiving slot of the base to enhance the heat dissipation rate.

16 Claims, 9 Drawing Sheets

COIL ASSEMBLY FOR LINEAR MOTOR

BACKGROUND OF THE INVENTION

1. Field of the Invention

The present invention relates to a coil assembly for a linear motor, especially to one that increases the contacting area between coils and the inner wall of a receiving slot of a base to promote the heat dissipation rate.

2. Description of the Related Art

Generally, the coil assembly for a linear motor without a core would have its coil unit covered by a resin encapsulated layer for further being received in an indentation of a base. However, since the resin encapsulated layer is made of the high polymer plastic, the heat dissipation effect is unsatisfied; especially, if the coil winding is electrified, the coil thereof is subject to being overheated.

In order to settle the overheated coil, "A Linear Motor without a Core" is issued by an R.O.C. patent no. I288521. Wherein, such disclosure is able to lower the temperature of the armature winding. Moreover, a rotor in the disclosure consists of an armature winding and a rotor installing platen. Herein, the armature winding includes a plurality of coils, and the rotor installing platen provides a support for the armature winding. Further, a stator comprised in the disclosure is composed of a permanent magnet with multiple magnetic poles and a yoke. Thereby, the permanent magnet would clasp the left and right sides of the armature winding to form the linear motor without a core. An indentation is further defined under the rotor installing platen, thence permitting an upper portion of the coil to insert into the indentation on the rotor installing platen. Additionally, a space is disposed near a lower portion of the coil for executing the connection between the coils or between the coils and a leading wire. However, some shortcomings exist in such invention:

Conventionally, the coil is directly inserted in the indentation on the rotor installing platen for promoting the heat dissipation rate. However, the daily application of the linear motor without a core has an increasing demand. Namely, the current flowed in the coil requires higher. If a certain thrust is generated in accordance with the daily increased current demand, the corresponding current value employed on the coil winding should be enhanced to the square of the current value. As a result, such invention needs to more extend the heat dissipation efficiency thereof.

SUMMARY OF THE INVENTION

It is an object of the present invention to provide a coil assembly for a linear motor for settling the conventional disadvantage of the unsatisfied heat dissipation rate. A coil assembly for a linear motor in accordance with the present invention comprises a coil unit including a plurality of adjacently arranged coils; each of the coils having two corresponding vertical action sides and non-action sides with respect to the vertical action sides, the non-action sides including a first non-action side and a second non-action side; a bending shape being accordingly formed between any two adjacent coils on the first non-action side, allowing a plurality of interlaced first bending sections to be formed on the coils of the coil unit; a plurality of conducting wires being extended from the second non-action side on the coils of the coil unit; a base including a receiving slot thereon; a cross-section of the receiving slot corresponding in shape to a cross-section of the first bending sections of the coils for insertion of the coils; and a resin encapsulated layer covering portions of the coils that are exposed to the receiving slot of the base, permitting the resin encapsulated layer to seal the receiving slot of the base.

Preferably, any two adjacent coils are interlacedly superimposed.

Preferably, each of the coils includes a plurality of sub-coils superimposed with each other.

Preferably, the cross-section of the receiving slot of the base is in a reversed V-shape.

Preferably, the cross-section of the receiving slot of the base is in a reversed Y-shape.

Preferably, the cross-section of the receiving slot of the base is in a reversed T-shape.

Preferably, the first bending portions of the coils are bent toward an inner thereof for forming respective second bending portions; the cross-section of the receiving slot of the base corresponds in shape to the cross-sections of the first bending portions and the second bending portions of the coils.

Preferably, the sub-coils are crotched and interlaced at the first bending portion.

Preferably, at least one cooling channel is disposed on the base.

Preferably, the cooling channel is axially extended along the base.

Preferably, any two of the adjacent coils are bent at the second non-action side, so that a plurality of third bending portions are interlacedly provided.

Preferably, the conducting wires are connected with an external cable at the vertical action sides of the coils on an end section of the coil unit, and the external cable is disposed on the coils at the second non-action side passing from an end portion of the base to enter into the resin encapsulated layer.

Preferably, an insulating layer is disposed on a surface of the receiving slot of the base. Moreover, the insulating layer is adhered to the surface of the receiving slot of the base by one of pouring, plating, smearing, sticking, and placing for further combining with the coil assembly, so as to maintain a high insulating capability between the coils and the base.

Accordingly, the present invention has the following advantages:

1. The contacting area between the coils and the inner wall of the receiving slot of the base is increased to promote the thermal conduction therebetween. Further by means of the cooling channel, the heat convection between the base and air could be speeded up for advantageously enhancing the heat dissipation rate.
2. By providing the insulating layer on the surface of the receiving slot of the base, the higher insulating competence could be achieved on the coils and the base.

DETAILED DESCRIPTION OF THE PREFERRED EMBODIMENTS

Figure 1:
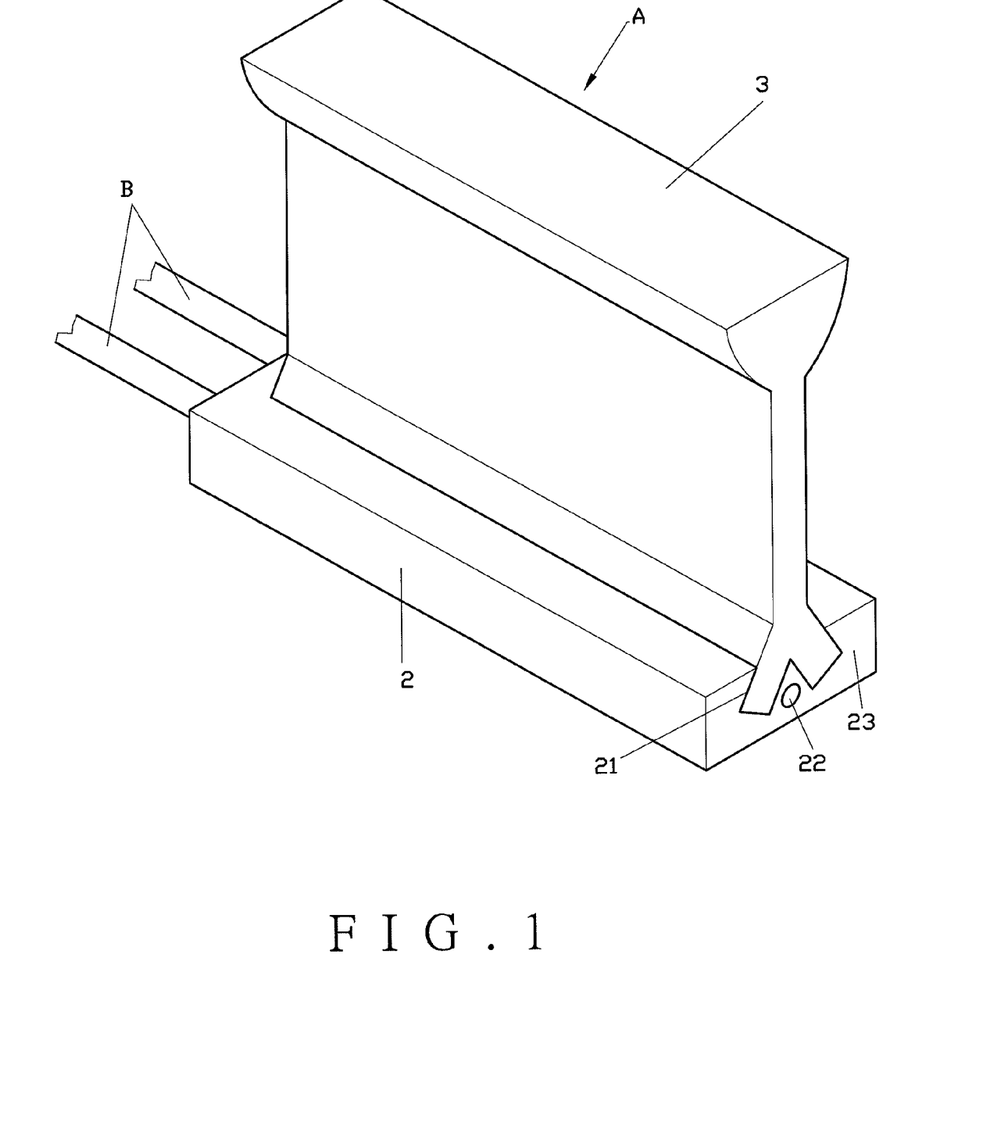
FIG. 1 is a perspective view showing the present invention.
Figure 2:
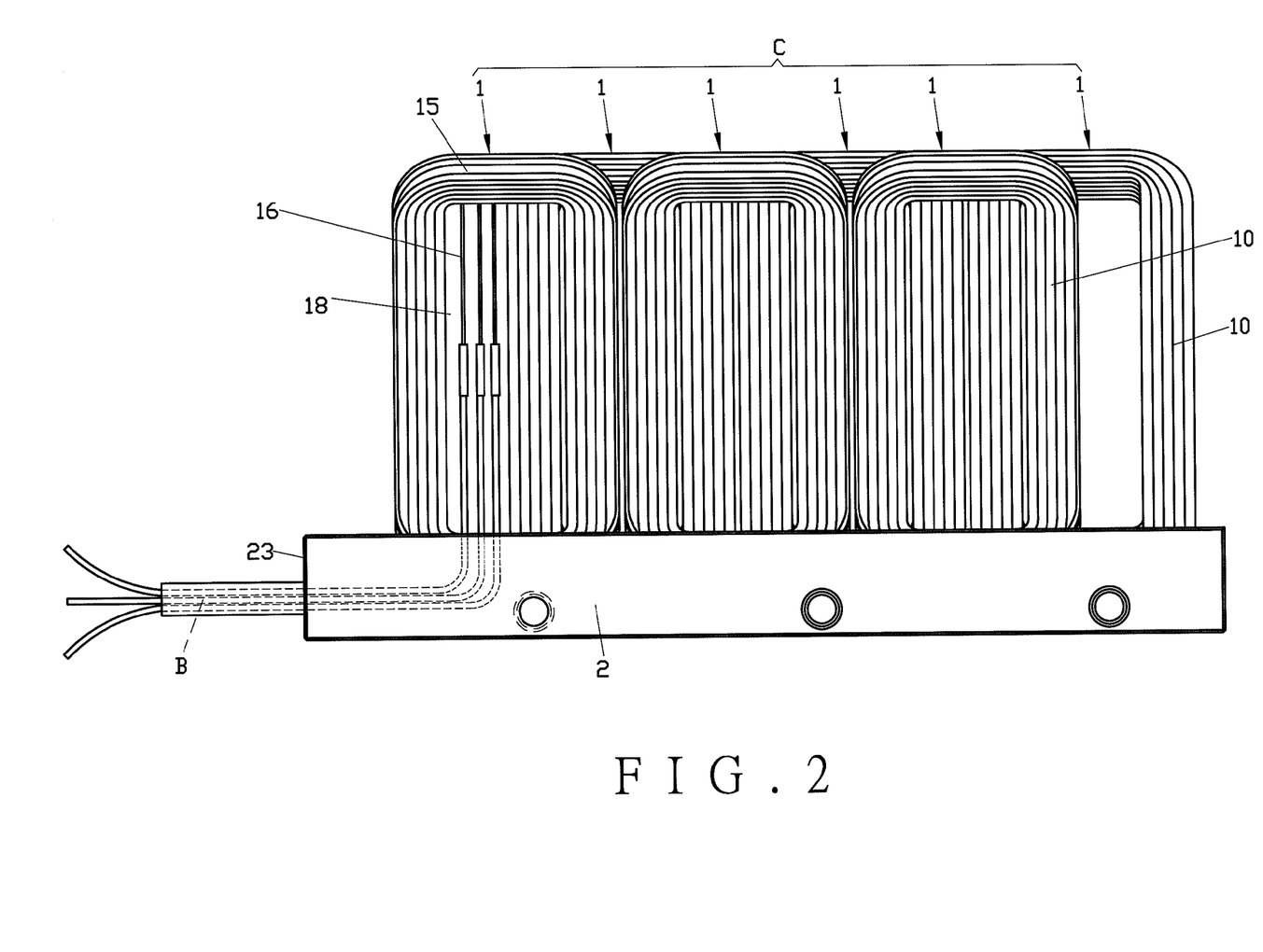
FIG. 2 is a side view showing the present invention without the resin encapsulated layer.
Figure 3:
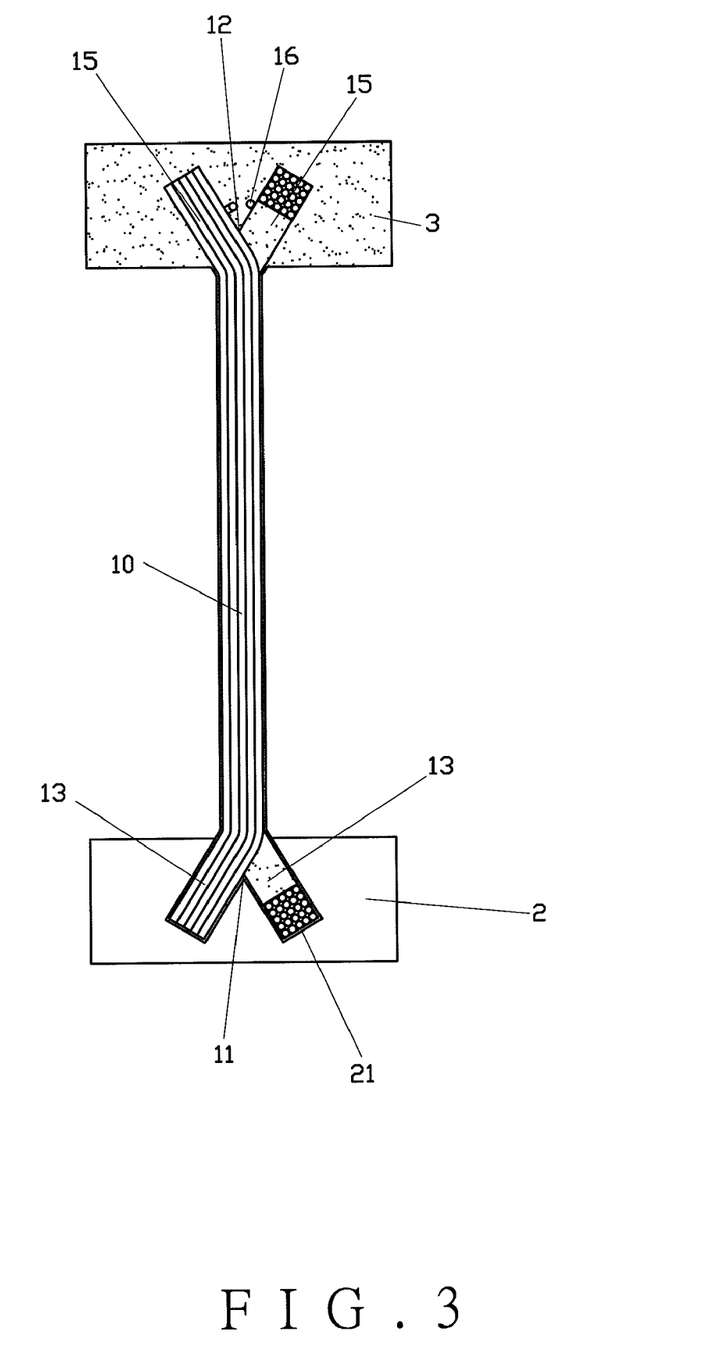
FIG. 3 is a cross-sectional view showing the first bending section in a reversed V-shape and the base of the present invention.

As shown in FIGS. 1 to 3, a coil assembly (A) for a linear motor of a preferred embodiment of the present invention comprises a coil unit (C), a base (2) and a resin encapsulated layer (3).

Figure 4:
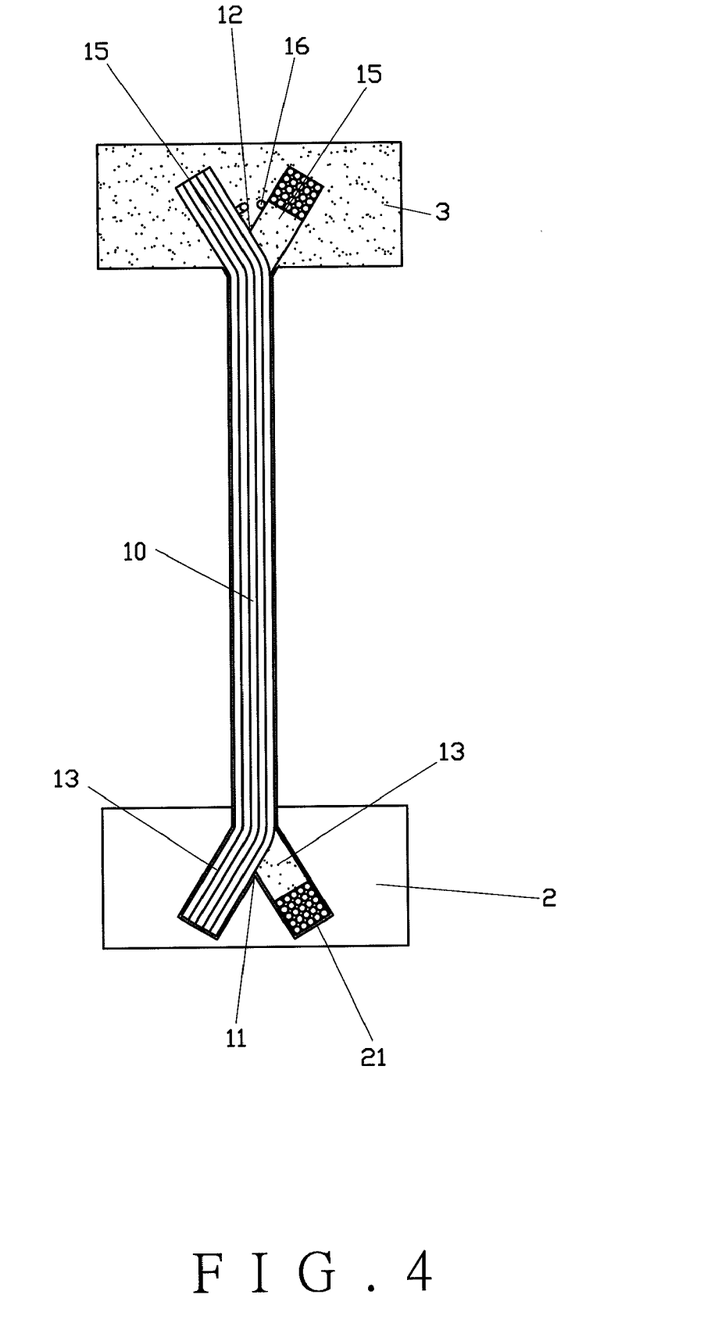
FIG. 4 is a cross-sectional view showing the first bending section in a reversed Y-shape and the base of the present invention.
Figure 5:
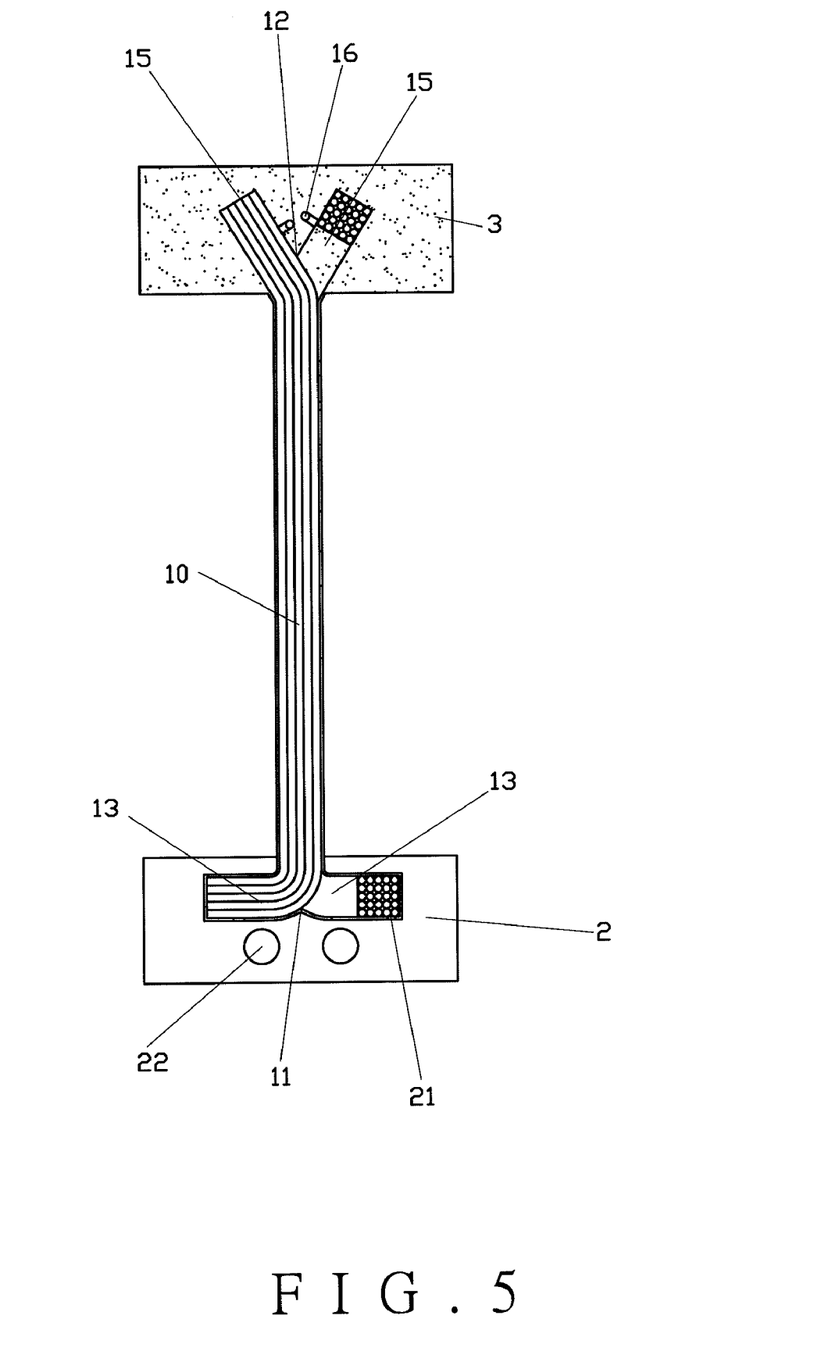
FIG. 5 is a cross-sectional view showing the first bending section in a reversed T-shape and a base of the present invention.
Figure 6:
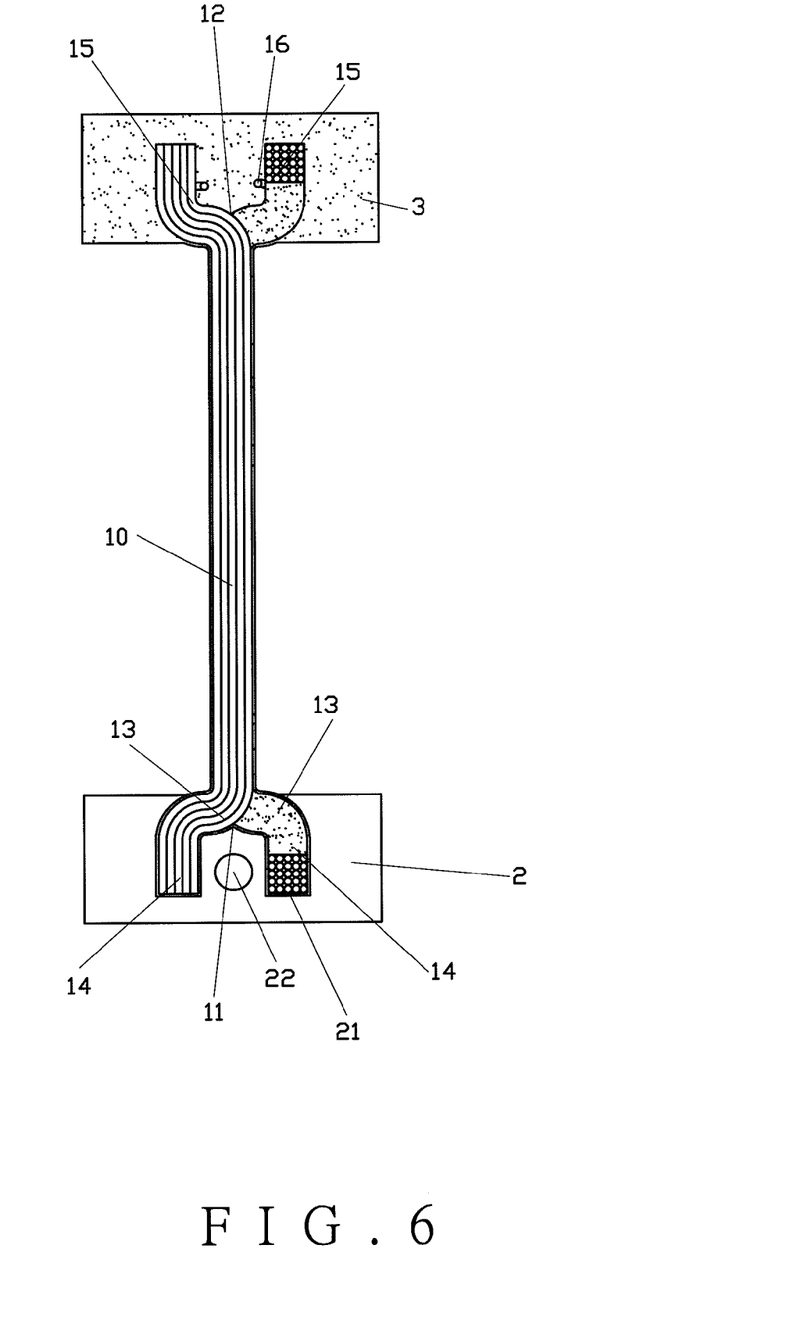
FIG. 6 is a cross-sectional view showing the second bending section of the coil unit and the base of the present invention.
Figure 7:
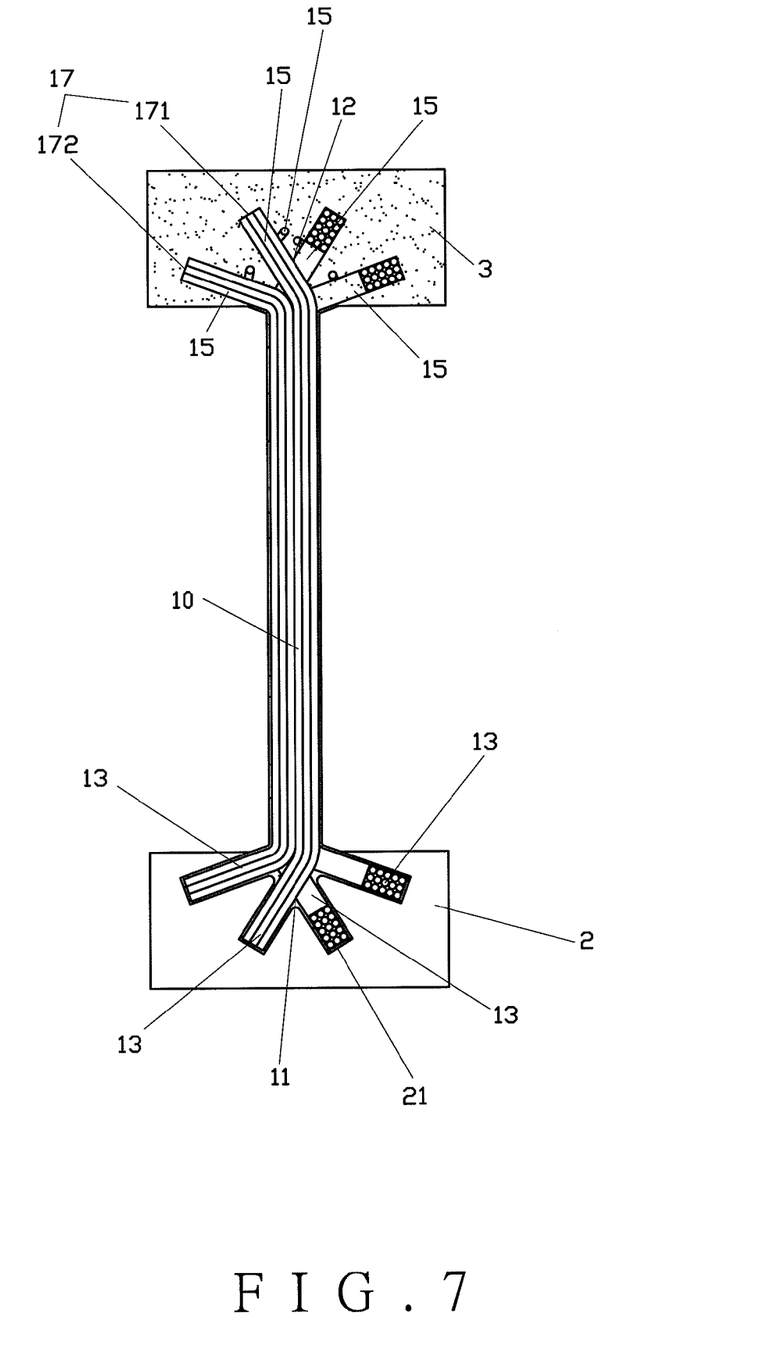
FIG. 7 is a cross-sectional view showing a plurality of sub-coils of the coils formed on the first bending section in a crotched and interlaced shape and the base of the present invention.

The coil unit (C) includes a plurality of adjacently arranged coils (1). Wherein, any two of the adjacent coils (1) are interlacedly superimposed. Thereby, a smaller volume of the entire creation could be achieved for fitting with a more compact room contained in the linear motor. The coils (1) include two corresponding vertical action sides (10) and non-action sides with respect to the vertical action sides (10). Wherein, the non-action sides include a first non-action side (11) and a second non-action side (12). Moreover, a correspondent bending shape is formed on any two adjacent coils (1) at the first non-action side (11), so that multiple first bending sections (13) are interlaced accordingly. A cross-section of each first bending section (13) is formed in a reversed V-shape, and a cross-section of a receiving slot (21) of the base (2) is correspondingly formed in the reversed V-shape (as shown in FIG. 3) as well. As it should be, the cross-section of each first bending section (13) and the receiving slot (21) of the base (2) could be alternatively formed in a reversed Y-shape as shown in FIG. 4 or in a reversed T-shape as shown in FIG. 5. In addition, the first bending sections (13) could be bent toward an inner thereof for respectively forming second bending sections (14), so that the cross-section of the receiving slot (21) of the base (2) would be formed with respect to the cross-sections of the first bending section (13) and the second bending section (14) as shown in FIG. 6. The coils (1) include a plurality of sub-coils (17) superimposed with each other. Wherein, the sub-coils (17) are crotched and interlaced on the first bending section (13) of the first non-action side (11) as shown in FIG. 7, any one of the sub-coils (17) includes a first sub-coil (171) and a second sub-coil (172) superposed with each other, and the first sub-coil (171) and the second sub-coil (172) are crotched and interlaced. Additionally, any two of the adjacent coils (1) are bent correspondingly on the second non-action side (12) so as to form a plurality of interlaced third bending sections (15). A plurality of conducting wires (16) are disposed on the second non-action side (12) of the coils (1) of the coil unit (C). The conducting wires (16) extend to the second non-action side (12) of an end section (18) of the coils (1) and bend toward the vertical action sides (10) of the coils (1) on the end section (18) of the coil unit (c), allowing an interconnection with an external cable (B). Therefore, external current is able to pass through the coil unit (C) for implementation, and the third bending section (15) of the coils (1) is served for guiding the conducting wires (16).

The base (2) includes the receiving slot (21) having its cross-section corresponding in shape to the cross-section of the first bending section (13) of the coils (1), thence allowing insertion of the coils (1). At least one cooling channel (22) is disposed on the base (2), and the cooling channel (22) is axially extended along the base (2).

The resin encapsulated layer (3) covers parts of the coils (1) that are exposed to the receiving slot (21) of the base (2), thereby sealing the receiving slot (21) of the base (2).

Figure 9:
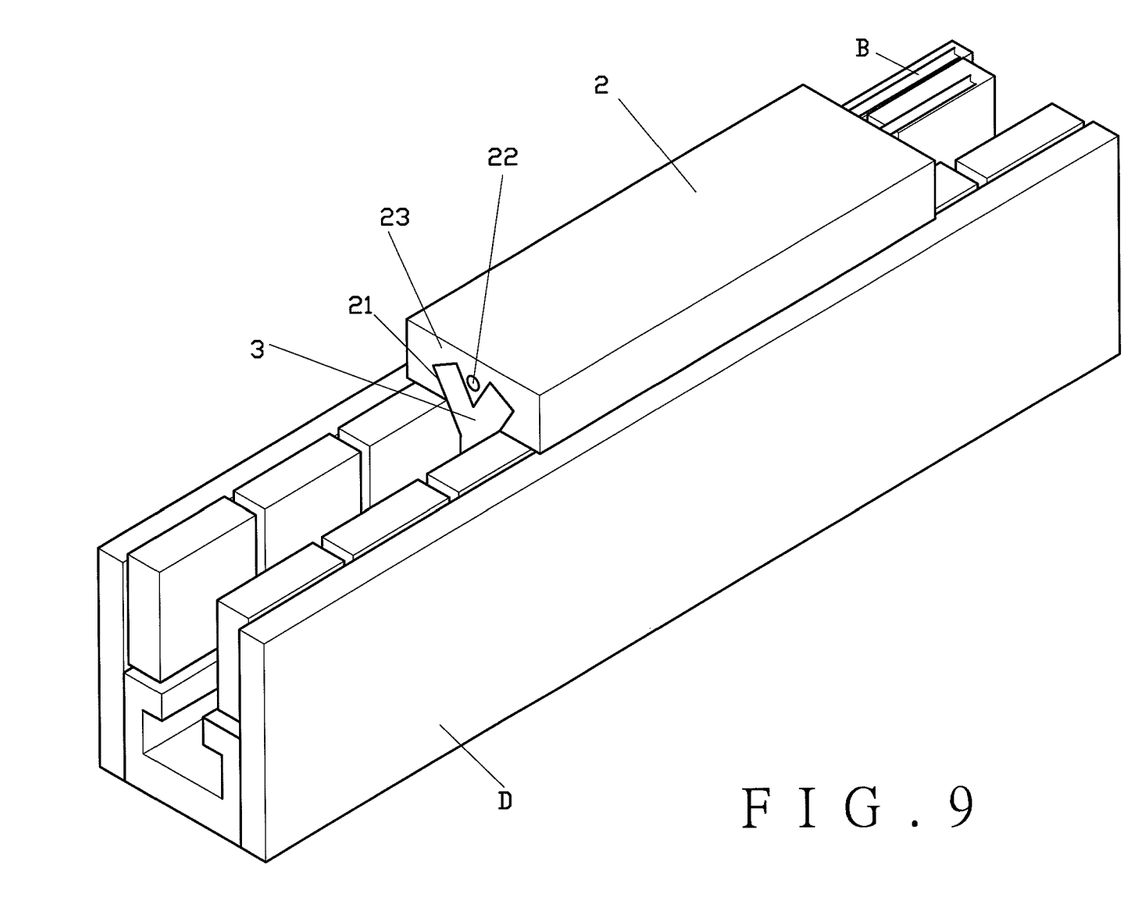
FIG. 9 is a schematic view showing the present invention when in use.

Referring to FIG. 9, when in use, the present invention is applied to a magnetic rail (D). Moreover, the general coil assembly (A) for a linear motor without a core comprises the base (2) made by the aluminum alloy. Herein, the aluminum alloy possesses an extremely high thermal conduction coefficient. According to the thermal conduction formula:

$$Q=-KA(dT/dX)$$

Wherein Q is heat flux, K is thermal conduction coefficient, A is contacting area, and (dT/dX) is temperature gradient. Namely, while increasing the contacting area between the coils (1) and the inner wall of the receiving slot (21) of the base (2), the heat dissipation rate could be efficiently promoted. Thus, the present invention utilizes the conducting wires (16) on the second non-action side (12) of the coils (1) for further going around the end section (18) of the coils (1) and stretching toward the vertical action sides (10). Thereby, the conducting wires (16) are able to connect with the external cable (B) that enters from an end portion (23) of the base (2) into the resin encapsulated layer (3). Thus, since the conducting wires (16) are not directly disposed on the first non-action side (11) of the coils (1), some spaces would be reserved thereon. Further, the surface area of the first bending section (13) that is interlacedly bent on the first non-action side (11) of the coils (1) is increased, so the contacting area between the coils (1) and the inner wall of the receiving slot (21) of the base (2) is also promoted. As a result, the heat dissipation rate could be beneficially enhanced. Further, the first bending section (13) could be bent toward the inner thereof for forming the second bending section (14) as desired. Thereby, the contacting area between the coils (1) and the inner wall of the receiving slot (21) of the base (2) could be increased for enhancing the heat dissipation rate. As it should be, the coils (1) could be alternatively formed by a plurality of sub-coils (17). Wherein, the sub-coils (17) are crotched and interlaced on the first bending section (13), and the cross-sections thereof are formed in a plurality of crotched shapes, thereby permitting an increased contacting area with the base (2) to augment the heat dissipation rate.

By means of the cooling channel (22), the base (2) is able to speed up the heat convection with the air for decreasing the temperature thereof, and the appropriate temperature gradient on the contacting area between the inner wall of the receiving slot (21) of the base (2) and the coils (1) could be preferably maintained, so that the heat dissipation rate of the coils (1) could be favorably boosted. The cross-sections of the first bending sections (13) could be formed in a reversed V-shape, a reversed Y-shape, a reversed T-shape, or a plurality of crotched and interlaced shapes in accordance with the contour of the base (2). Whereby, the number of the cooling channel (22) on the base (2) could be increased for accelerating the heat convection between the surface of the base (2) and the air, thence resulting in a promoted heat dissipation rate.

Figure 8:
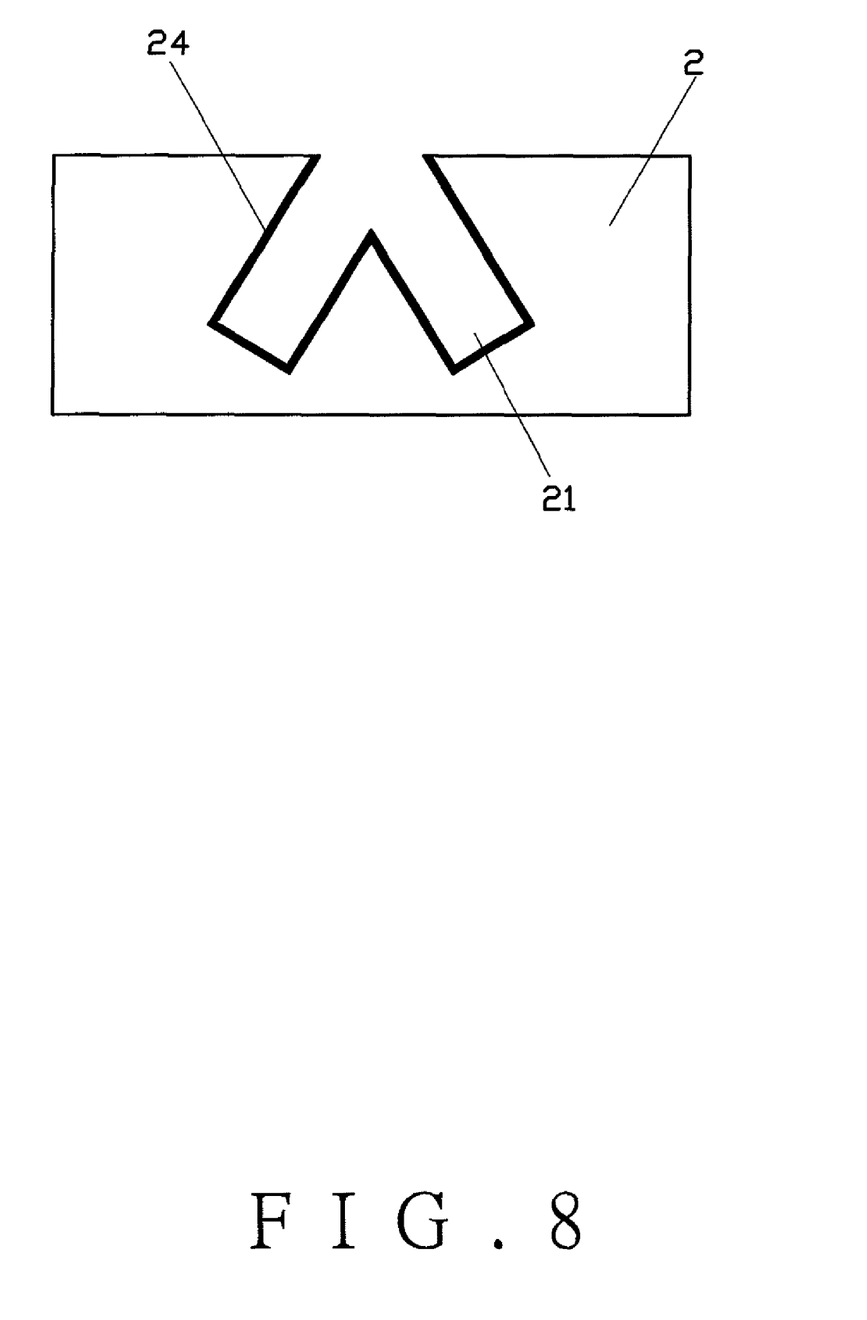
FIG. 8 is a cross-sectional view showing the surface of the receiving slot of the base being adhered by the insulating layer of the present invention.

Since the coil unit (C) includes the plurality of coils (1), the coils (1) could not be precisely formed in view of the wound and bent conducting wires. That is to say, when the coil unit (C) is coupled to the receiving slot (21) of the base (2) and poured with the resin encapsulated layer (3), the coil unit (C) readily contacts with the surface of the receiving slot (21) of the base (2). As a result, the insulating capability could be merely provided by the insulating layer on the conducting wires of the coils (1). Accordingly, in order to promote the insulating capability thereof, an insulating layer (24) is further applied to the surface of the receiving slot (21) of the base (2), as shown in FIG. 8. Wherein, the insulating layer (24) adopts the material like the resin for pouring, the insulating plating film, the Varnish, the PI insulating tape, or insulating paper, etc. Moreover, the insulating layer could be previously poured, electroplated, smeared, or stuck to the surface of the receiving slot (21) of the base (2), thence allowing the combination with the coil unit (C). Therefore, the insulating competence between the coils (1) and the base (2) could be preferably promoted. Favorably, for keeping a higher heat dissipation effect, the insulating layer (24) has a thickness less than 1 mm.

I claim:

1. A coil assembly for a linear motor, comprising:
a coil unit including a plurality of adjacently arranged coils; each of the coils having two corresponding vertical action sides and non-action sides with respect to the vertical action sides, the non-action sides including a first non-action side and a second non-action side; a bending shape being accordingly formed between any two adjacent coils on said first non-action side, allowing a plurality of interlaced first bending sections to be formed on said coils of said coil unit; a plurality of conducting wires being extended from said second non-action side on said coils of said coil unit;
a base including a receiving slot thereon; a cross-section of said receiving slot corresponding in shape to a cross-section of said first bending sections for insertion of said coils; and
a resin encapsulated layer covering portions of said coils that are exposed to said receiving slot of said base, permitting said resin encapsulated layer to seal said receiving slot of said base.

2. The coil assembly for a linear motor as claimed in claim 1, wherein, any two adjacent coils are interlacedly superimposed.

3. The coil assembly for a linear motor as claimed in claim 1, wherein, said cross-section of said receiving slot of said base is in a reversed V-shape.

4. The coil assembly for a linear motor as claimed in claim 1, wherein, said cross-section of said receiving slot of said base is in a reversed Y-shape.

5. The coil assembly for a linear motor as claimed in claim 1, wherein, said cross-section of said receiving slot of said base is in a reversed T-shape.

6. The coil assembly for a linear motor as claimed in claim 1, wherein, said first bending portions of said coils are bent toward an inner thereof, thereby respectively forming second bending portions; said cross-section of said receiving slot of said base corresponds in shape to said cross-sections of said first bending portions and said second bending portions of said coils.

7. The coil assembly for a linear motor as claimed in claim 1, wherein, at least one cooling channel is disposed on said base.

8. The coil assembly for a linear motor as claimed in claim 7, wherein, said cooling channel is axially extended along said base.

9. The coil assembly for a linear motor as claimed in claim 1, wherein, any two of said adjacent coils are formed by a bended shape on said second non-action side, so that a plurality of third bending portions are interlacedly provided.

10. The coil assembly for a linear motor as claimed in claim 1, wherein, each of said coils includes a plurality of sub-coils superimposed with each other.

11. The coil assembly for a linear motor as claimed in claim 10, wherein, said sub-coils are crotched and interlaced at said first bending portion, and cross-sections of said sub-coils are formed by a plurality of crotched and interlaced shapes.

12. The coil assembly for a linear motor as claimed in claim 1, wherein, said conducting wires are connected with an external cable at said vertical action sides of said coils on an end section of said coil unit, and said external cable is disposed on said coils at said second non-action side passing from an end portion of said base to enter into said resin encapsulated layer.

13. The coil assembly for a linear motor as claimed in claim 1, wherein, an insulating layer is disposed on a surface of said receiving slot of said base.

14. The coil assembly for a linear motor as claimed in claim 13, wherein, said insulating layer is adhered to said surface of said receiving slot of said base by one of pouring, plating, smearing, sticking, and placing.

15. The coil assembly for a linear motor as claimed in claim 13, wherein, said insulating layer is made of a resin for pouring, an insulating plating film, Varnish, a PI insulating tape, or an insulating paper.

16. The coil assembly for a linear motor as claimed in claim 13, wherein, the insulating layer has a thickness less than 1 mm.

* * * * *